(12) United States Patent
Moura et al.

(10) Patent No.: US 11,988,145 B2
(45) Date of Patent: May 21, 2024

(54) APPARATUS AND METHOD FOR MITIGATING AIRFLOW SEPARATION AROUND ENGINE COMBUSTOR

(71) Applicant: RTX Corporation, Farmington, CT (US)

(72) Inventors: Dennis M. Moura, South Windsor, CT (US); Carey Clum, East Hartford, CT (US)

(73) Assignee: RTX CORPORATION, Farmington, CT (US)

( * ) Notice: Subject to any disclaimer, the term of this patent is extended or adjusted under 35 U.S.C. 154(b) by 75 days.

(21) Appl. No.: 16/241,187

(22) Filed: Jan. 7, 2019

(65) Prior Publication Data

US 2020/0025083 A1 Jan. 23, 2020

Related U.S. Application Data

(60) Provisional application No. 62/616,942, filed on Jan. 12, 2018.

(51) Int. Cl.
*F23R 3/16* (2006.01)
*F02C 7/18* (2006.01)
*F23R 3/26* (2006.01)

(52) U.S. Cl.
CPC ............... *F02C 7/18* (2013.01); *F23R 3/16* (2013.01); *F23R 3/26* (2013.01); *F23R 2900/03044* (2013.01)

(58) Field of Classification Search
CPC .. F23R 3/002; F23R 3/04; F23R 3/045; F23R 3/08; F23R 2900/00004;
(Continued)

(56) References Cited

U.S. PATENT DOCUMENTS 2,782,597 A * 2/1957 Parsons ..................... F23R 3/44
60/746
4,852,355 A 8/1989 Kenworthy et al.
(Continued)

FOREIGN PATENT DOCUMENTS

EP 2423599 A2 2/2012
EP 3002412 A1 4/2016
(Continued)

OTHER PUBLICATIONS

The Extended European Search Report for Application No. 19151720.0-1009; dated May 21, 2019; Report Received Date: May 22, 2019; 7 pages.

*Primary Examiner* — Arun Goyal
(74) *Attorney, Agent, or Firm* — CANTOR COLBURN LLP

(57) ABSTRACT

According to one embodiment, a gas turbine engine component assembly is provided. The gas turbine engine component assembly comprising: a first component having a first surface and a second surface opposite the first surface, the first component including a cooling hole extending from the second surface to the first surface through the first component, wherein the second surface of the first component is oriented relative to a first airflow path such that airflow in the first airflow path separates from the second surface of the first component; and a first fairing secured to the first component proximate the second surface of the first component, the first fairing being configured to redirect airflow in the first airflow path such that the airflow exits the first fairing oriented parallel with the second surface of the first component.

13 Claims, 10 Drawing Sheets

(58) Field of Classification Search
CPC .. F23R 2900/00017; F23R 2900/03041; F23R 2900/03042; F23R 2900/03043; F23R 2900/03044; F23R 2900/03045; F05D 2240/35; F05D 2260/201–202; F05D 2260/607

See application file for complete search history.

(56) References Cited

U.S. PATENT DOCUMENTS

| | | | |
|---|---|---|---|
| 6,122,917 A * | 9/2000 | Senior | F23R 3/002 165/908 |
| 7,488,154 B2 | 2/2009 | Wiedermann et al. | |
| 7,493,767 B2 * | 2/2009 | Bunker | F23R 3/002 60/752 |
| 9,534,783 B2 * | 1/2017 | Dierberger | F23R 3/002 |
| 9,644,843 B2 * | 5/2017 | Herborth | F23R 3/54 |
| 2008/0245053 A1 | 10/2008 | Commaret et al. | |
| 2013/0061594 A1 | 3/2013 | Stewart | |
| 2016/0290225 A1 | 10/2016 | Armit et al. | |
| 2017/0016620 A1 | 1/2017 | Masquelet et al. | |
| 2017/0130651 A1 * | 5/2017 | Nasr | F23R 3/002 |

FOREIGN PATENT DOCUMENTS

| | | | |
|---|---|---|---|
| EP | 3076079 A1 | 10/2016 | |
| EP | 3258066 A1 | 12/2017 | |

\* cited by examiner

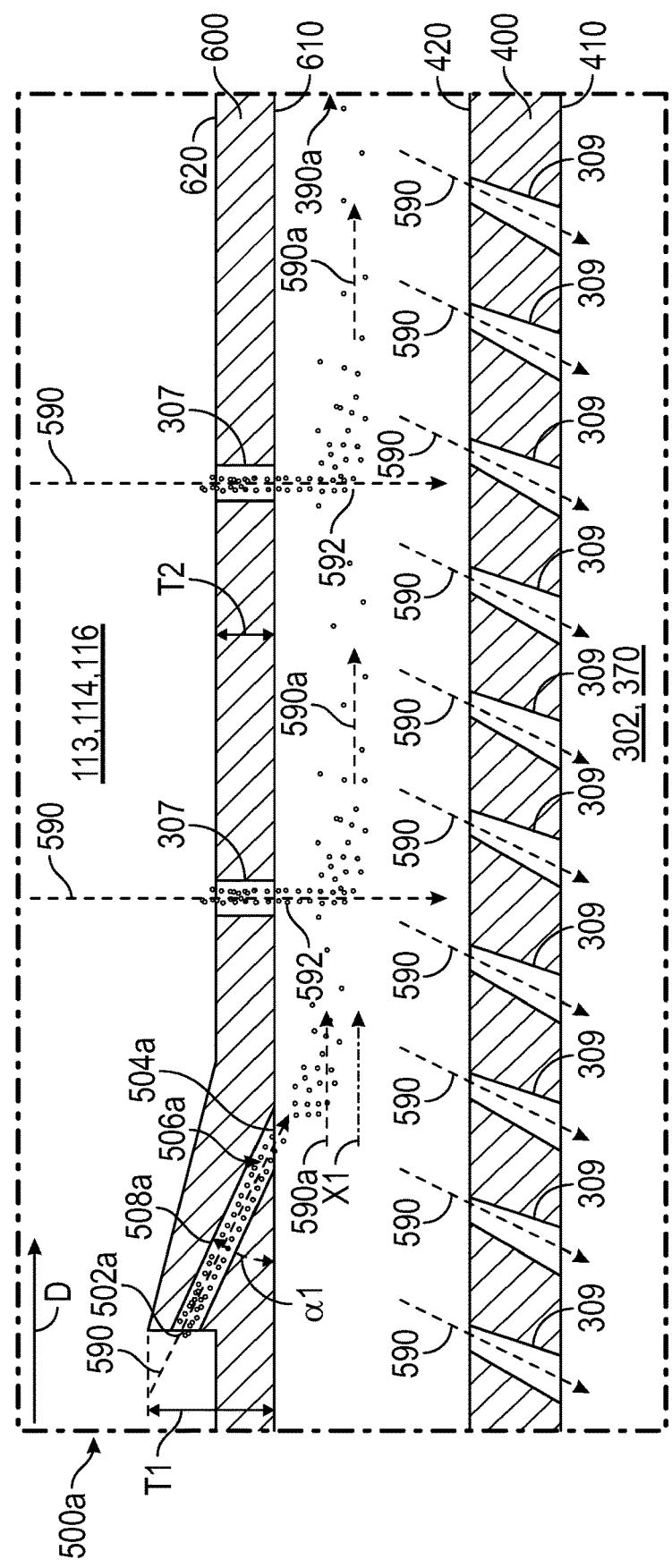
FIG. 4A
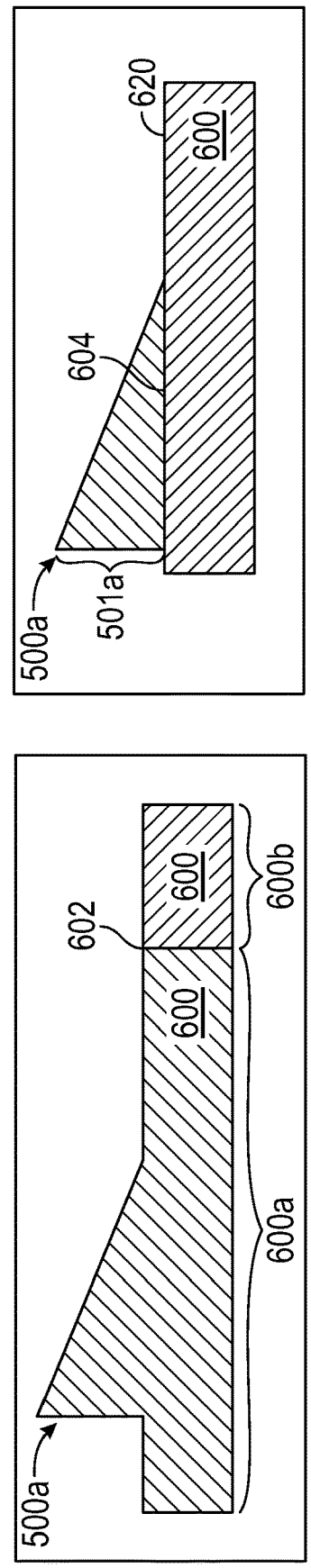
FIG. 4A-1
FIG. 4A-2

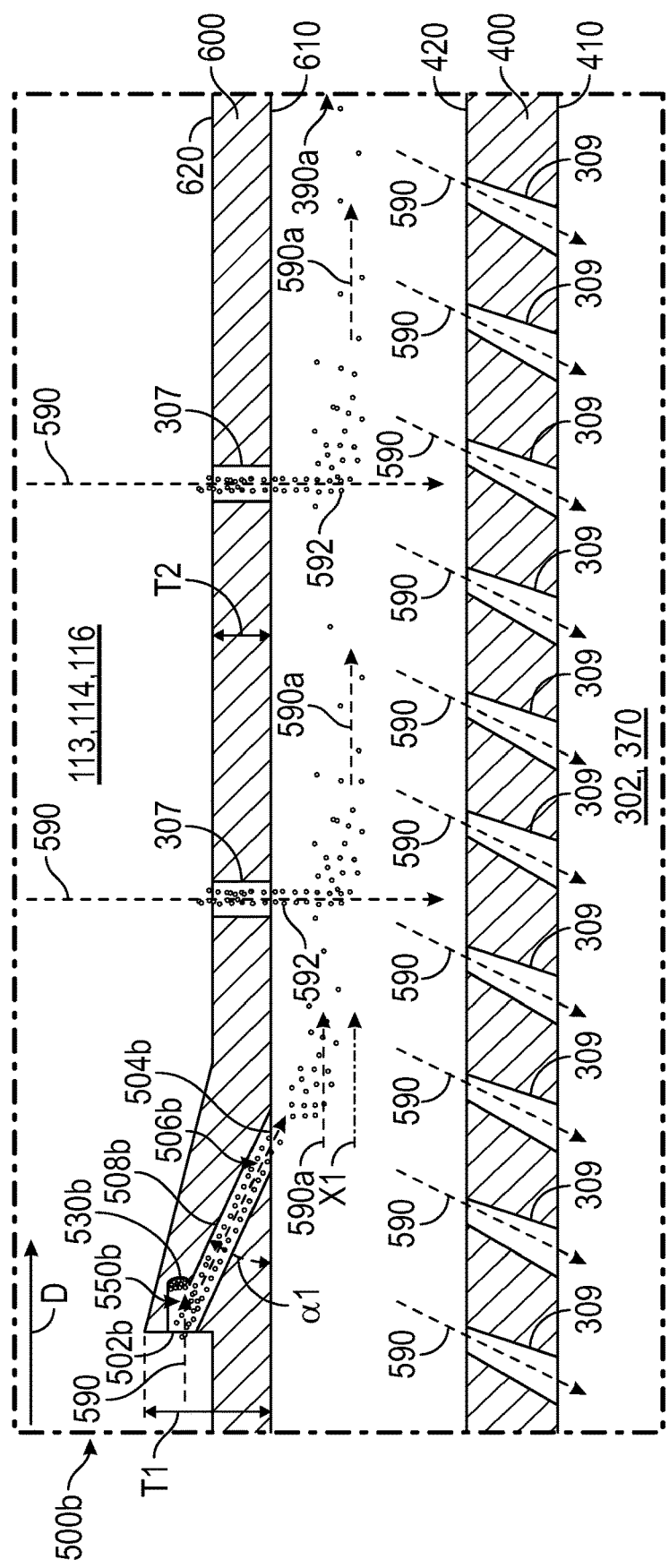
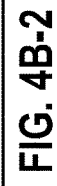
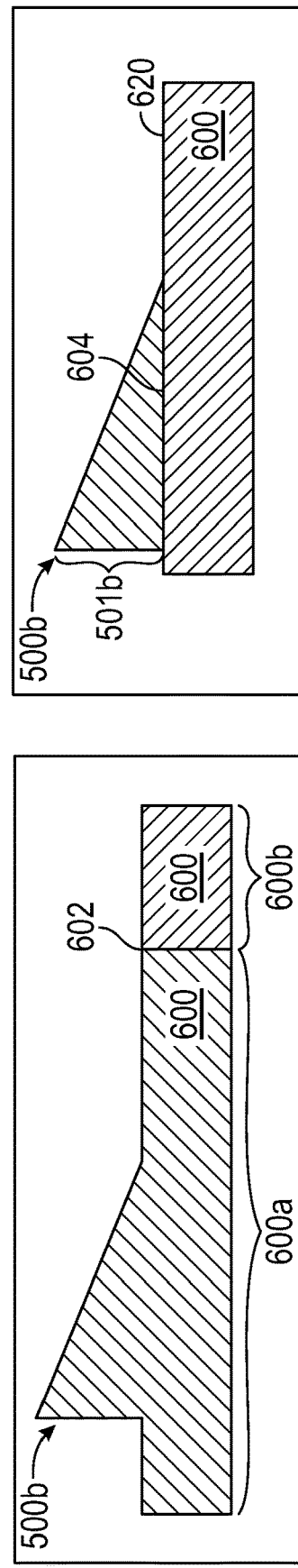
FIG. 4B
FIG. 4B-1
FIG. 4B-2

APPARATUS AND METHOD FOR MITIGATING AIRFLOW SEPARATION AROUND ENGINE COMBUSTOR

CROSS-REFERENCE TO RELATED APPLICATIONS

This application claims the benefit of U.S. Provisional Application No. 62/616,942 filed Jan. 12, 2018, which is incorporated herein by reference in its entirety.

BACKGROUND

The subject matter disclosed herein generally relates to gas turbine engines and, more particularly, to a method and apparatus for mitigating airflow separation around a combustor of gas turbine engines.

In one example, a combustor of a gas turbine engine may be configured and required to burn fuel in a minimum volume. Such configurations may place substantial heat load on the structure of the combustor (e.g., panels, shell, etc.). Such heat loads may dictate that special consideration is given to structures, which may be configured as heat shields or panels, and to the cooling of such structures to protect these structures. Excess temperatures at these structures may lead to oxidation, cracking, and high thermal stresses of the heat shields or panels. Particulates in the air used to cool these structures may inhibit cooling of the heat shield and reduce durability. Particulates, in particular atmospheric particulates, include solid or liquid matter suspended in the atmosphere such as dust, ice, ash, sand, and dirt.

SUMMARY

According to one embodiment, a gas turbine engine component assembly is provided. The gas turbine engine component assembly comprising: a first component having a first surface and a second surface opposite the first surface, the first component including a cooling hole extending from the second surface to the first surface through the first component, wherein the second surface of the first component is oriented relative to a first airflow path such that airflow in the first airflow path separates from the second surface of the first component; and a first fairing secured to the first component proximate the second surface of the first component, the first fairing being configured to redirect airflow in the first airflow path such that the airflow exits the first fairing oriented parallel with the second surface of the first component.

In addition to one or more of the features described above, or as an alternative, further embodiments may include a second fairing secured to the first fairing, the second fairing being configured to redirect airflow in a second airflow path such that the airflow exits the second fairing oriented parallel with the second surface of the first component, wherein the first fairing is interposed between the second fairing and the first component.

In addition to one or more of the features described above, or as an alternative, further embodiments may include that the first fairing is secured to the first component through a bolt located in a cowl component attached to the first component.

In addition to one or more of the features described above, or as an alternative, further embodiments may include a bracket attached to the first fairing, the bracket securing the first fairing to the first component through the bolt.

In addition to one or more of the features described above, or as an alternative, further embodiments may include a second component having a first surface and a second surface, the first surface of the first component and the second surface of the second component defining a cooling channel therebetween in fluid communication with the cooling hole for cooling the second surface of the second component, wherein the first fairing is secured to first component through an attachment mechanism, the attachment mechanism securing the second component to the first component.

In addition to one or more of the features described above, or as an alternative, further embodiments may include a bracket attached to the first fairing, the bracket securing the first fairing to the first component through the attachment mechanism.

In addition to one or more of the features described above, or as an alternative, further embodiments may include a second component having a first surface and a second surface, the first surface of the first component and the second surface of the second component defining a cooling channel therebetween in fluid communication with the cooling hole for cooling the second surface of the second component; and a lateral flow injection feature formed in the first component, the lateral flow injection feature fluidly connecting airflow exiting the first fairing to the cooling channel, the lateral flow injection feature being configured to direct airflow from the airflow path through a passageway and into the cooling channel in a lateral direction parallel to the second surface of the second component such that a cross flow is generated in the cooling channel.

In addition to one or more of the features described above, or as an alternative, further embodiments may include that the passageway further comprises: a guide wall oriented at a selected angle configured to direct airflow in the lateral direction parallel to the second surface of the second component such that the cross flow is generated in the cooling channel.

In addition to one or more of the features described above, or as an alternative, further embodiments may include that the lateral flow injection feature is fluidly connected to the airflow exiting the first fairing through an inlet oriented parallel with the airflow exiting the first fairing.

In addition to one or more of the features described above, or as an alternative, further embodiments may include a second component having a first surface and a second surface, the first surface of the first component and the second surface of the second component defining a cooling channel therebetween in fluid communication with the cooling hole for cooling the second surface of the second component, wherein the second component further comprises a cooling hole extending from the second surface of the second component to the first surface of the second component and fluidly connecting the cooling channel to an area located proximate the first surface of the second component.

According to another embodiment, a combustor for use in a gas turbine engine is provided. The combustor enclosing a combustion chamber having a combustion area. The combustor comprises: a combustion liner having an inner surface and an outer surface opposite the inner surface, the combustion liner including a primary aperture extending from the outer surface to the inner surface through the combustion liner, wherein the outer surface of the combustion liner is oriented relative to a first airflow path such that airflow in the first airflow path separates from the outer surface of the combustion liner; and a first fairing secured to the combustor, the first fairing being configured to redirect airflow in the first airflow path such that the airflow exits the first fairing oriented parallel with the outer surface of the combustion liner.

In addition to one or more of the features described above, or as an alternative, further embodiments may include a second fairing secured to the first fairing, the second fairing being configured to redirect airflow in a second airflow path such that the airflow exits the second fairing oriented parallel with the outer surface of the combustion liner, wherein the first fairing is interposed between the second fairing and the combustor.

In addition to one or more of the features described above, or as an alternative, further embodiments may include that the first fairing is secured to the combustor through a bolt located in a cowl of the combustor.

In addition to one or more of the features described above, or as an alternative, further embodiments may include a bracket attached to the first fairing, the bracket securing the first fairing to the combustor through the bolt.

In addition to one or more of the features described above, or as an alternative, further embodiments may include a heat shield panel interposed between the inner surface of the combustion liner and the combustion area, the heat shield panel having a first surface and a second surface opposite the first surface, wherein the second surface is oriented towards the inner surface, and wherein the heat shield panel is separated from the liner by an impingement cavity, wherein the first fairing is secured to combustor through an attachment mechanism, the attachment mechanism securing the heat shield panel to the combustion liner.

In addition to one or more of the features described above, or as an alternative, further embodiments may include a bracket attached to the first fairing, the bracket securing the first fairing to the combustor through the attachment mechanism.

In addition to one or more of the features described above, or as an alternative, further embodiments may include a heat shield panel interposed between the inner surface of the combustion liner and the combustion area, the heat shield panel having a first surface and a second surface opposite the first surface, wherein the second surface is oriented towards the inner surface, and wherein the heat shield panel is separated from the liner by an impingement cavity; and a lateral flow injection feature formed in the combustion liner, the lateral flow injection feature fluidly connecting airflow exiting the first fairing to the impingement cavity, the lateral flow injection feature being configured to direct airflow from the airflow path through a passageway and into the impingement cavity in a lateral direction parallel to the second surface of the heat shield panel such that a cross flow is generated in the impingement cavity.

In addition to one or more of the features described above, or as an alternative, further embodiments may include that the passageway further comprises: a guide wall oriented at a selected angle configured to direct airflow in the lateral direction parallel to the second surface of the heat shield panel such that the cross flow is generated in the impingement cavity.

In addition to one or more of the features described above, or as an alternative, further embodiments may include that the lateral flow injection feature is fluidly connected to the airflow exiting the first fairing through an inlet oriented parallel with the airflow exiting the first fairing.

In addition to one or more of the features described above, or as an alternative, further embodiments may include a heat shield panel interposed between the inner surface of the combustion liner and the combustion area, the heat shield panel having a first surface and a second surface opposite the first surface, wherein the second surface is oriented towards the inner surface, and wherein the heat shield panel is separated from the liner by an impingement cavity, wherein the heat shield panel further comprises a secondary aperture extending from the second surface of the heat shield panel to the first surface of the heat shield panel and fluidly connecting the impingement cavity to the combustion area.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

FIG. 4A is an illustration of a configuration of a lateral flow injection feature for a combustor of a gas turbine engine, in accordance with an embodiment of the disclosure;

FIG. 4A-1 is an illustration of a method of forming the lateral flow injection feature of FIG. 4A, in accordance with an embodiment of the disclosure;

FIG. 4A-2 is an illustration of a method of forming the lateral flow injection feature of FIG. 4A, in accordance with an embodiment of the disclosure;

FIG. 4B is an illustration of a configuration of a lateral flow injection feature for a combustor of a gas turbine engine, in accordance with an embodiment of the disclosure;

FIG. 4B-1 is an illustration of a method of forming the lateral flow injection feature of FIG. 4B, in accordance with an embodiment of the disclosure;

FIG. 4B-2 is an illustration of a method of forming the lateral flow injection feature of FIG. 4B, in accordance with an embodiment of the disclosure;

The detailed description explains embodiments of the present disclosure, together with advantages and features, by way of example with reference to the drawings.

DETAILED DESCRIPTION

A detailed description of one or more embodiments of the disclosed apparatus and method are presented herein by way of exemplification and not limitation with reference to the Figures.

Combustors of gas turbine engines, as well as other components, experience elevated heat levels during operation. Impingement and convective cooling of panels of the combustor wall may be used to help cool the combustor. Convective cooling may be achieved by air that is channeled between the panels and a liner of the combustor. Impingement cooling may be a process of directing relatively cool air from a location exterior to the combustor toward a back or underside of the panels.

Thus, combustion liners and heat shield panels are utilized to face the hot products of combustion within a combustion chamber and protect the overall combustor shell. The combustion liners may be supplied with cooling air including dilution passages which deliver a high volume of cooling air into a hot flow path. The cooling air may be air from the compressor of the gas turbine engine. The cooling air may impinge upon a back side of a heat shield panel that faces a combustion liner inside the combustor. The cooling air may contain particulates, which may build up on the heat shield panels overtime, thus reducing the cooling ability of the cooling air. Embodiments disclosed herein seek to address particulate adherence to the heat shield panels in order to maintain the cooling ability of the cooling air.

Figure 1:
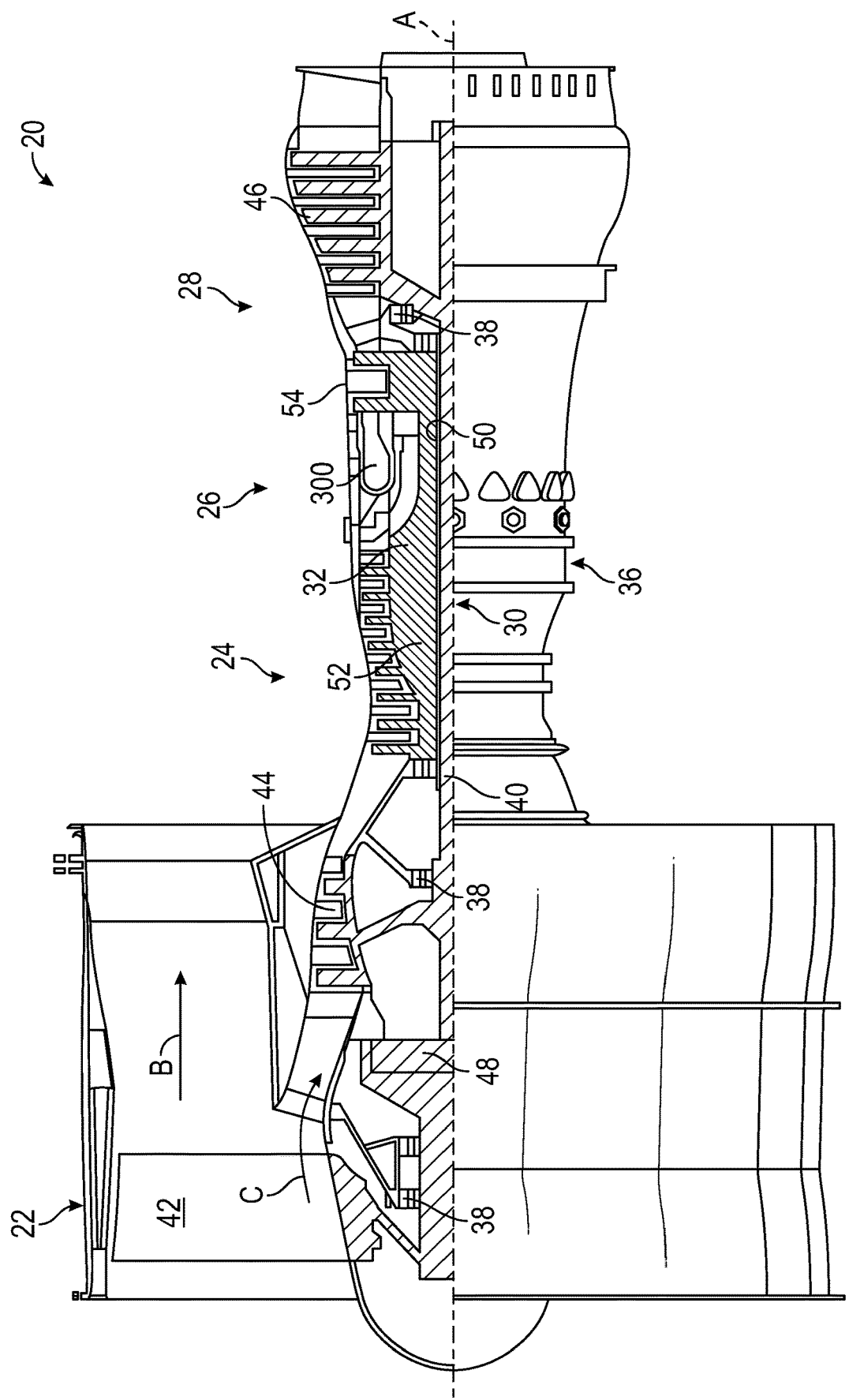
FIG. 1 is a partial cross-sectional illustration of a gas turbine engine, in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 300 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 300, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

Figure 2:
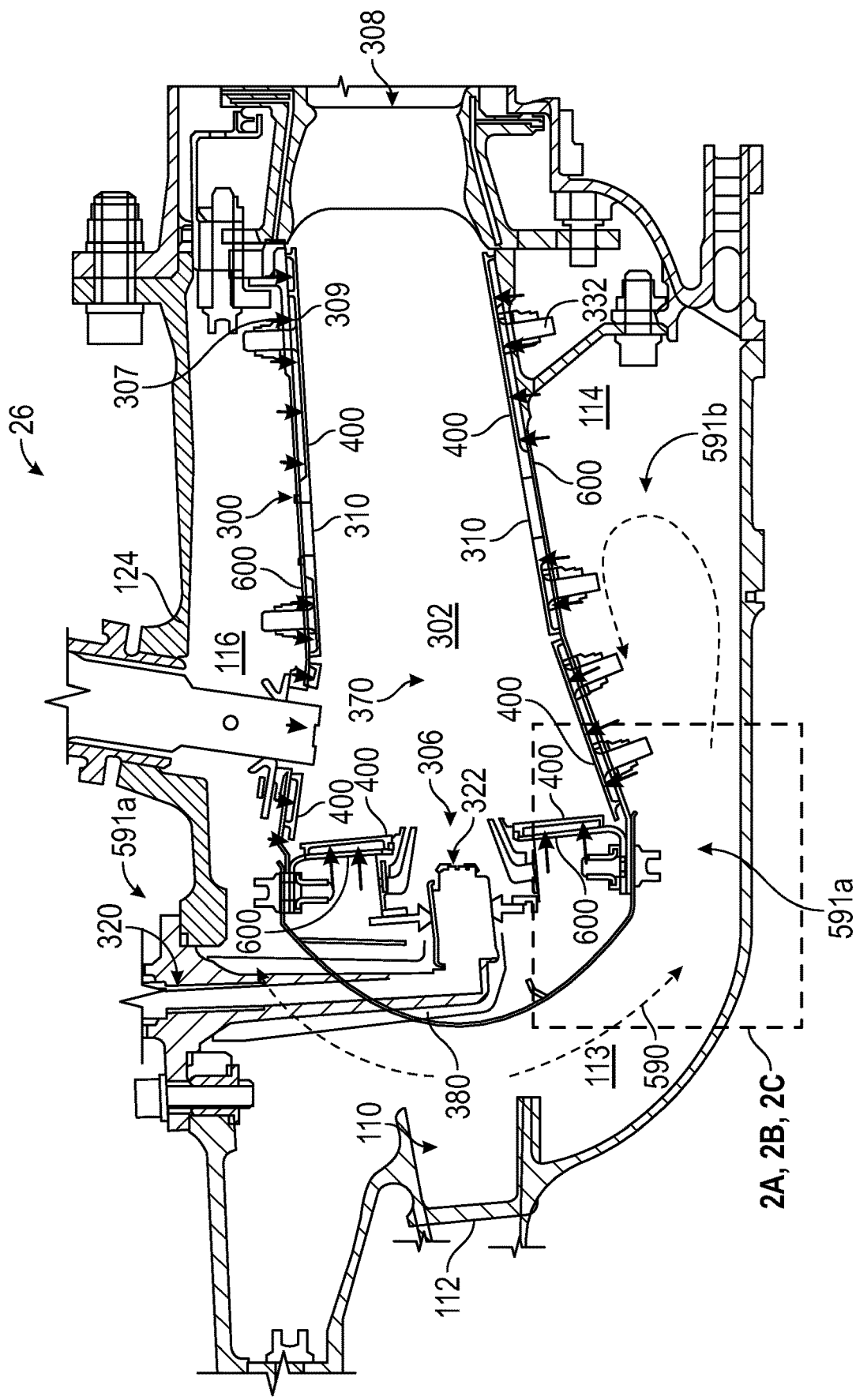
FIG. 2 is a cross-sectional illustration of a combustor, in accordance with an embodiment of the disclosure.

Referring now to FIG. 2 and with continued reference to FIG. 1, the combustor section 26 of the gas turbine engine 20 is shown. As illustrated, a combustor 300 defines a combustion chamber 302. The combustion chamber 302 includes a combustion area 370 within the combustion chamber 302. The combustor 300 includes an inlet 306 and an outlet 308 through which air may pass. The air may be supplied to the combustor 300 by a pre-diffuser 110. Air may also enter the combustion chamber 302 through other holes in the combustor 300 including but not limited to quench holes 310, as seen in FIG. 2.

Compressor air is supplied from the compressor section 24 into a pre-diffuser strut 112. As will be appreciated by those of skill in the art, the pre-diffuser strut 112 is configured to direct the airflow into the pre-diffuser 110, which then directs the airflow toward the combustor 300. The combustor 300 and the pre-diffuser 110 are separated by a shroud chamber 113 that contains the combustor 300 and includes an inner diameter branch 114 and an outer diameter branch 116. As air enters the shroud chamber 113, a portion of the air may flow into the combustor inlet 306, a portion may flow into the inner diameter branch 114, and a portion may flow into the outer diameter branch 116. As the airflow 590 flows from the shroud chamber 113 to the inner diameter branch 114 and the outer diameter branch 116, the airflow 590 must turn/wrap around cowl 380 of the combustor 300. Often the airflow 590 cannot make the turn around the cowl 380 and the airflow 590 separates at location 591a from the combustion liner 600 and may form a low velocity region at location 591b near the combustion liner 600. The outer surface 620 (see FIG. 3) of the combustion liner 600 is oriented relative to airflow 590 in the inner diameter branch 114 such that airflow 590 in the inner diameter branch 114 separates from the outer surface 620 of the combustion liner 600.

The air from the inner diameter branch 114 and the outer diameter branch 116 may then enter the combustion chamber 302 by means of one or more primary apertures 307 in the combustion liner 600 and one or more secondary apertures 309 in the heat shield panels 400. The flow separation and low velocity regions may inhibit airflow through the primary apertures 307. The primary apertures 307 and secondary apertures 309 may include nozzles, holes, etc. The air may then exit the combustion chamber 302 through the combustor outlet 308. At the same time, fuel may be supplied into the combustion chamber 302 from a fuel injector 320 and a pilot nozzle 322, which may be ignited within the combustion chamber 302. The combustor 300 of the engine combustion section 26 may be housed within a shroud case 124 which may define the shroud chamber 113.

Figure 3:
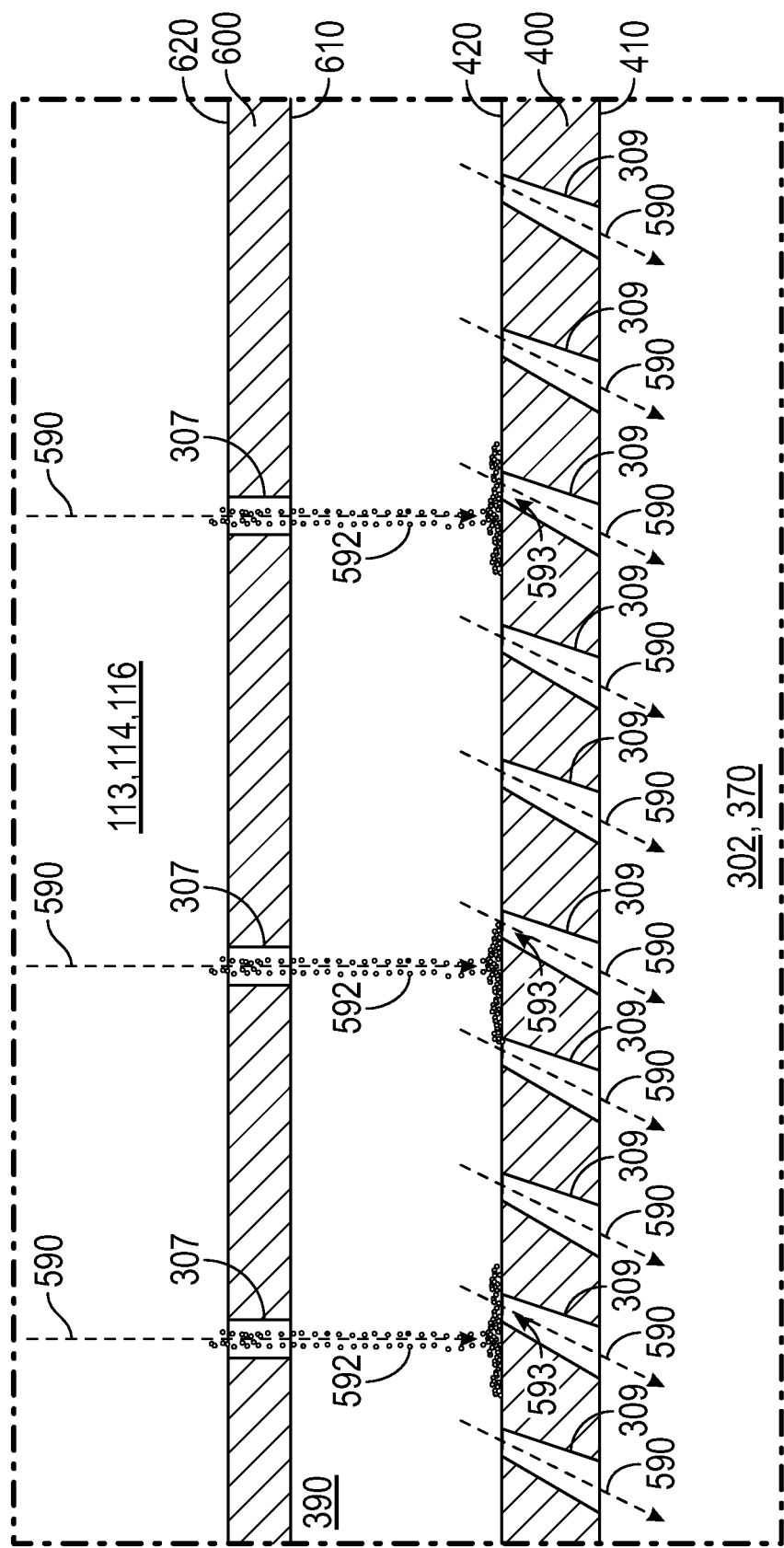
FIG. 3 is an enlarged cross-sectional illustration of a heat shield panel and combustion liner of a combustor, in accordance with an embodiment of the disclosure.

The combustor 300, as shown in FIG. 2, includes multiple heat shield panels 400 that are attached to the combustion liner 600 (See FIG. 3). The heat shield panels 400 may be arranged parallel to the combustion liner 600. The combustion liner 600 can define circular or annular structures with the heat shield panels 400 being mounted on a radially inward liner and a radially outward liner, as will be appreciated by those of skill in the art. The heat shield panels 400 can be removably mounted to the combustion liner 600 by one or more attachment mechanisms 332. In some embodiments, the attachment mechanism 332 may be integrally formed with a respective heat shield panel 400, although other configurations are possible. In some embodiments, the attachment mechanism 332 may be a bolt or other structure that may extend from the respective heat shield panel 400 through the interior surface to a receiving portion or aperture of the combustion liner 600 such that the heat shield panel 400 may be attached to the combustion liner 600 and held in place. The heat shield panels 400 partially enclose a combustion area 370 within the combustion chamber 302 of the combustor 300.

Figure 2A:
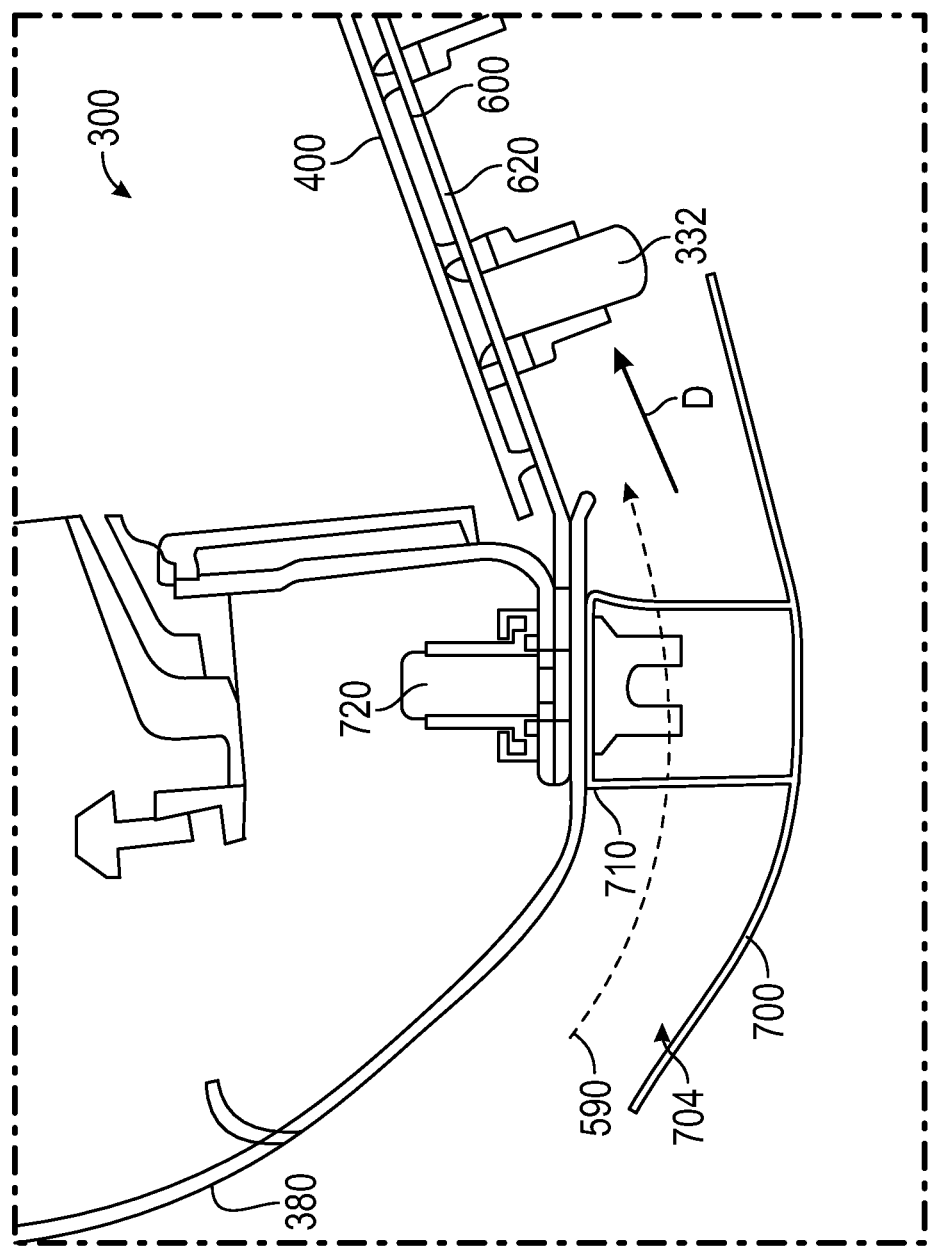
FIG. 2A is an enlarged cross-sectional illustration of the combustor of FIG. 2 having a fairing attached to the combustor, in accordance with an embodiment of the disclosure.
Figure 2B:
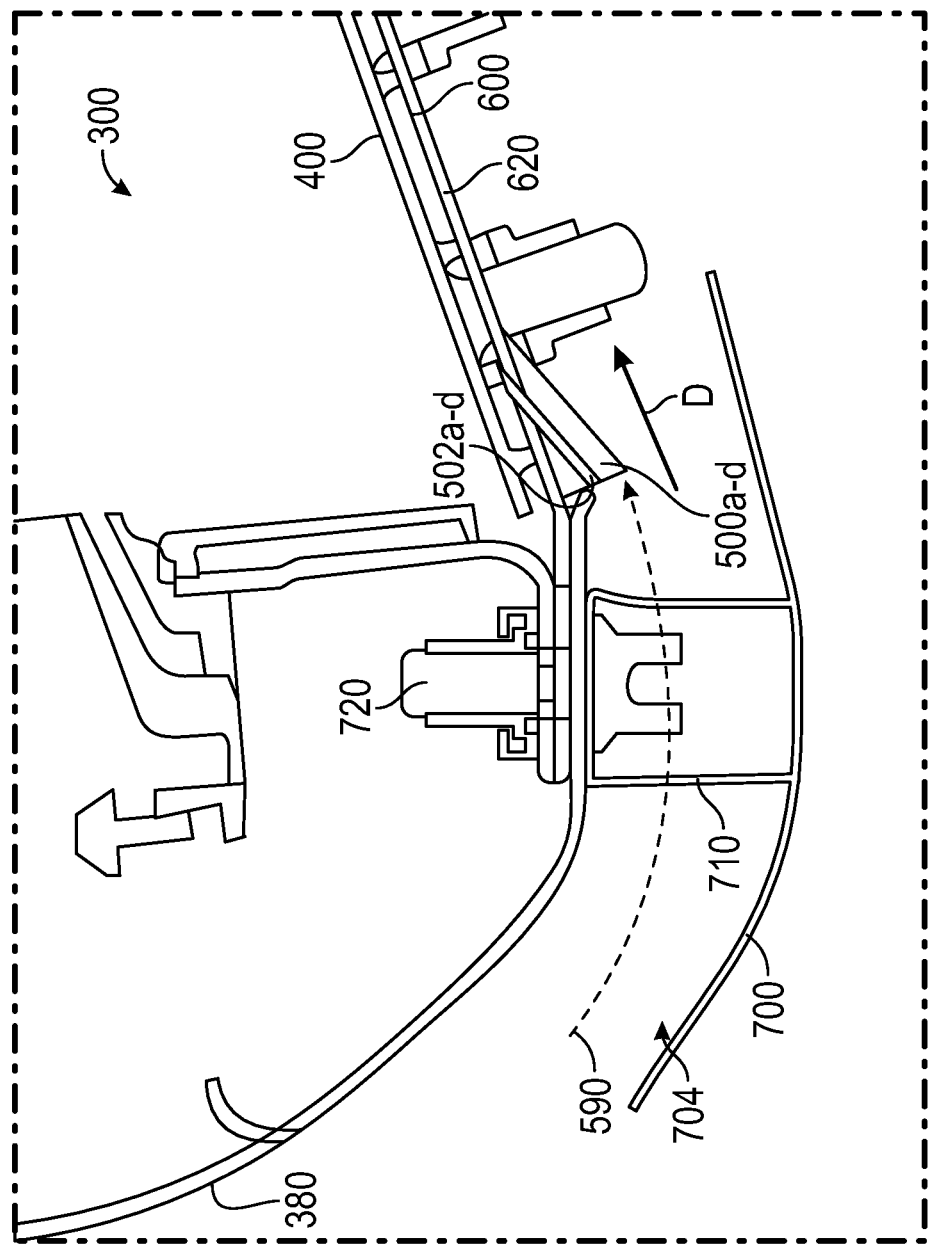
FIG. 2B is an enlarged cross-sectional illustration of the combustor of FIG. 2 having a fairing attached to the combustor, in accordance with an embodiment of the disclosure.
Figure 2C:
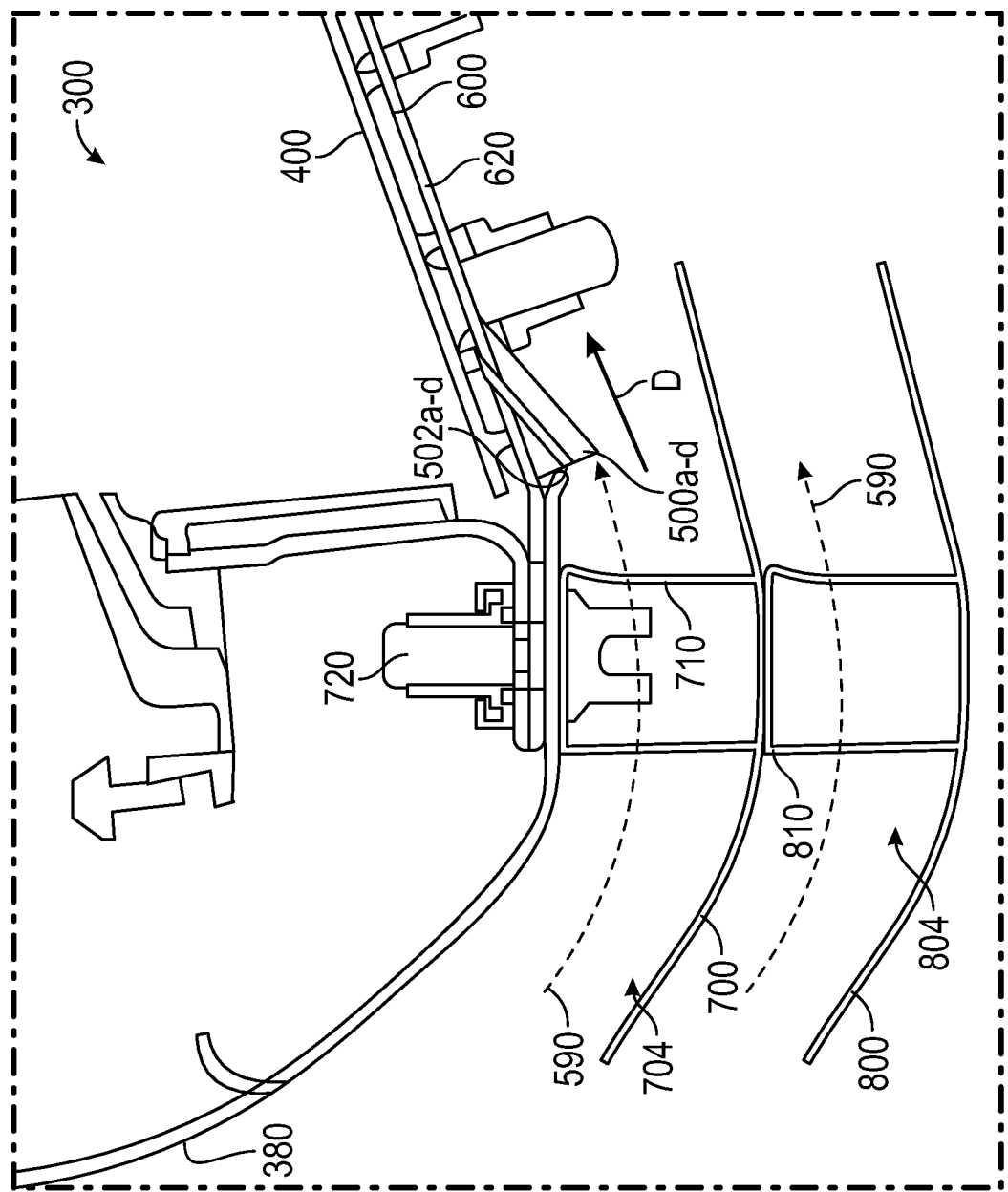
FIG. 2C is an enlarged cross-sectional illustration of the combustor of FIG. 2 having a fairing attached to the combustor, in accordance with an embodiment of the disclosure.

Referring now to FIGS. 2A-C, a first fairing 700 may be attached to the combustor 300. The first fairing 700 is configured to redirect airflow 590 in a first airflow path 704 such that the airflow 590 exits the first fairing 700 oriented parallel with the outer surface 620 of the combustion liner 600. The first fairing 700 may be operably secured to the combustor 300 through a bracket 710. The bracket 710 provides structural support for the first fairing 700 while allowing airflow 590 through the first airflow path 704. The bracket 710 may be secured to the combustor 300 by a bolt 720 of the cowl 380, as seen in FIGS. 2A-C. Alternatively, the bracket 710 may be secured to the combustor 300 at the attachment mechanism 332 that secures the heat shield panel 400 to the combustion liner 600. As shown in FIG. 2B, the first fairing 700 may be configured to redirect airflow 590 parallel to an inlet 502a-d of a lateral flow injection feature 500a-d. The inlet 502a-d may be oriented parallel to the first flow path 704. As illustrated in FIG. 2C, a first fairing 700 and a second fairing 800 may be utilized. The second fairing 800 is configured to redirect airflow 590 in a second airflow path 804 such that the airflow 590 exits the second fairing 800 oriented parallel with the outer surface 620 of the combustion liner 600. The first fairing 700 is interposed between the second fairing 800 and the combustor 300, as shown in FIG. 2C. The second fairing 800 may be attached to the first fairing 700 through a bracket 810. The bracket 810 provides structural support for the second fairing 800, while allowing air flow 590 through the second airflow path 804.

Advantageously, the first fairing 700 and the second fairing 800 reduce flow separation that occurs as the airflow 590 wraps around the cowl 380, as described above in reference to FIG. 2. Further, the first fairing 700 and the second fairing 800 help orient airflow 590 in the airflow path D parallel to the outer surface 620 of the combustion liner 600. When airflow 590 is expanding over a 7° half-angle it has a larger adverse pressure gradient and wants to separate. The addition of a second fairing 800 helps to allow the airflow 590 to expand over a shorter distance without separation.

Referring now to FIGS. 3 and 4A-D with continued reference to FIGS. 1 and 2. FIG. 3 illustrates a heat shield panel 400 and combustion liner 600 of a combustor 300 (see FIG. 1) of a gas turbine engine 20 (see FIG. 1). The heat shield panel 400 and the combustion liner 600 are in a facing spaced relationship. The heat shield panel 400 includes a first surface 410 oriented towards the combustion area 370 of the combustion chamber 302 and a second surface 420 first surface opposite the first surface 410 oriented towards the combustion liner 600. The combustion liner 600 is composed of a combustion liner 600 having an inner surface 610 and an outer surface 620 opposite the inner surface 610. The inner surface 610 is oriented toward the heat shield panel 400. The outer surface 620 is oriented outward from the combustor 300 proximate the inner diameter branch 114 and the outer diameter branch 116.

The combustion liner 600 includes a plurality of primary apertures 307 configured to allow airflow 590 from the inner diameter branch 114 and the outer diameter branch 116 to enter an impingement cavity 390 in between the combustion liner 600 and the heat shield panel 400. Each of the primary apertures 307 extend from the outer surface 620 to the inner surface 610 through the combustion liner 600.

Each of the primary apertures 307 fluidly connects the impingement cavity 390 to at least one of the inner diameter branch 114 and the outer diameter branch 116. The heat shield panel 400 may include one or more secondary apertures 309 configured to allow airflow 590 from the impingement cavity 390 to the combustion area 370 of the combustion chamber 302.

Each of the secondary apertures 309 extend from the second surface 420 to the first surface 410 through the heat shield panel 400. Airflow 590 flowing into the impingement cavity 390 impinges on the second surface 420 of the heat shield panel 400 and absorbs heat from the heat shield panel 400 as it impinges on the second surface 420. As seen in FIG. 3, particulate 592 may accompany the airflow 590 flowing into the impingement cavity 390. Particulate 592 may include but is not limited to dirt, smoke, soot, volcanic ash, or similar airborne particulate known to one of skill in the art. As the airflow 590 and particulate 592 impinge upon the second surface 420 of the heat shield panel 400, the particulate 592 may begin to collect on the second surface 420, as seen in FIG. 3. Particulate 592 collecting upon the second surface 420 of the heat shield panel 400 reduces the cooling efficiency of airflow 590 impinging upon the second surface 420 thus increases local temperatures of the heat shield panel 400 and the combustion liner 600. Particulate 592 collection upon the second surface 420 of the heat shield panel 400 may potentially create a blockage 593 to the secondary apertures 309 in the heat shield panels 400, thus reducing airflow 590 into the combustion area 370 of the combustion chamber 302. The blockage 593 may be a partial blockage or a full blockage.

The combustion liner 600 may include a lateral flow injection feature 500a-d configured to direct airflow from an airflow path D into the impingement cavity in about a lateral direction X1 such that a cross flow 590a is generated in the impingement cavity 590. The lateral direction X1 may be parallel relative to the second surface 420 of the heat shield panel 400. Advantageously, the addition of a lateral flow injection feature 500a-d to the combustion liner 600 generates a lateral airflow 590 thus promoting the movement of particulate 592 through the impingement cavity 390, thus reducing the amount of particulate 592 collecting on the second surface 420 of the heat shield panel 400, as seen in FIG. 4A-D. Also advantageously, if the impingement cavity 390 includes an exit 390a, the addition of a lateral flow injection feature 500a-d to the combustion liner 600 helps to generate and/or adjust a lateral airflow 590a, which promotes the movement of particulate 592 through the impingement cavity 390 and towards the exit 390a of the impingement cavity 390. Although only one is illustration in FIGS. 4A-4D, the combustion liner 600 may include one or more lateral flow injection features 500a-d. The lateral flow injection feature 500a-d is configured to allow airflow 590 in an airflow path D to enter through an inlet 502a-d proximate the outer surface 620, convey the airflow 590 through a passageway 506a-d, and expel the airflow 590 through an outlet 504a-d into the impingement cavity 390 in about a lateral direction. The passageway 506a-d fluidly connects the shroud chamber 113, the inner diameter branch 114, and/or the outer diameter branch 116 to the impingement cavity 390. The passageway 506a-d is fluidly connected to the shroud chamber 113, the inner diameter branch 114, and the outer diameter branch 116 through the inlet 502a-d. The passageway 506a-d is fluidly connected to impingement cavity 390 through the outlet 504a-d. The lateral flow injection feature 500a-d may be configured differently as shown in FIGS. 4A-D.

FIG. 4A illustrates a first configuration of a lateral flow injection feature 500a. A thickness T1 of the combustion liner 600 is greater at the first lateral flow injection feature 500a than a thickness T2 elsewhere in the combustion liner 600, which allows the lateral flow injection feature 500a extend away from the outer surface 620 of the combustion liner 600 into the airflow path D. The lateral flow injection feature 500a may be formed from the combustion liner 600 or securely attached to the combustion liner 600. FIG. 4A-1 illustrates the lateral flow injection feature 500a being formed from a first section 600a of a combustion liner 600 and then secured to a second section 600b of a combustion liner 600 through a mechanical joint 602, such as, for example, a weld. FIG. 4A-2 illustrates an upper portion 501a of the lateral flow injection feature 500a being formed and then secured to the outer surface of the combustion liner 600 through a mechanical joint 604, such as, for example, a weld or braze.

The passageway 506a of the lateral flow injection feature 500a may include a guide wall 508a oriented at a selected angle α1 configured to direct airflow 592 in about a lateral direction X1 to generate a cross flow 590a. In the example illustrated in FIG. 4A, the guide wall 508a encloses the passage way 506a. As illustrated in FIG. 4A, the passageway 506a may be circular in shape but it is understood that the passageway 506a may be shaped differently. The orientation of the inlet 502a may be about parallel with the airflow path D or perpendicular to the outer surface 620 of the combustion liner 600, as shown in FIG. 4A. Also, as illustrated in FIG. 4A, the inlet 502a may be circular in shape but it is understood that the inlet 502a may be shaped differently.

FIG. 4B illustrates a second configuration of a lateral flow injection feature 500b. A thickness T1 of the combustion liner 600 is greater at the second lateral flow injection feature 500b than a thickness T2 elsewhere in the combustion liner 600, which allows the lateral flow injection feature 500b extend away from the outer surface 620 of the combustion liner 600 into the airflow path D. The second lateral flow injection feature 500b may be formed from the combustion liner 600 or securely attached to the combustion liner 600. FIG. 4B-1 illustrates the lateral flow injection feature 500b being formed from a second section 600a of a combustion liner 600 and then secured to a second section 600b of a combustion liner 600 through a mechanical joint 602, such as, for example, a weld. FIG. 4B-2 illustrates an upper portion 501b of the lateral flow injection feature 500b being formed and then secured to the outer surface of the combustion liner 600 through a mechanical joint 604, such as, for example, a weld or braze.

The passageway 506b of the lateral flow injection feature 500b may include a guide wall 508b oriented at a selected angle α1 configured to direct airflow 592 in about a lateral direction X1 to generate a cross flow 590a. In the example illustrated in FIG. 4B, the guide wall 508b encloses the passage way 506b. As illustrated in FIG. 4B, the passageway 506b may be circular in shape but it is understood that the passageway 506b may be shaped differently. The orientation of the inlet 502b may be about parallel with the airflow path D or about perpendicular to the outer surface 620 of the combustion liner 600, as shown in FIG. 4B. Also, as illustrated in FIG. 4B, the inlet 502b may be circular in shape but it is understood that the inlet 502b may be shaped differently.

A particulate collection location 530b may be located opposite the inlet 502b and proximate a particulate separation 550b turn in the passageway 506b. The particulate collection location 530b in FIG. 4B is configured as a collection well. The particulate separation turn 550b is configured to turn airflow 590 a selected angle such that the airflow 590 will continue through the passageway 506b but momentum of the particulate 592 will carry the particulate 592 into the collection location 530b. Advantageously, the separation turn 550b may help reduce entry of particulate 592 into the impingement gap 390.

Figure 4C:
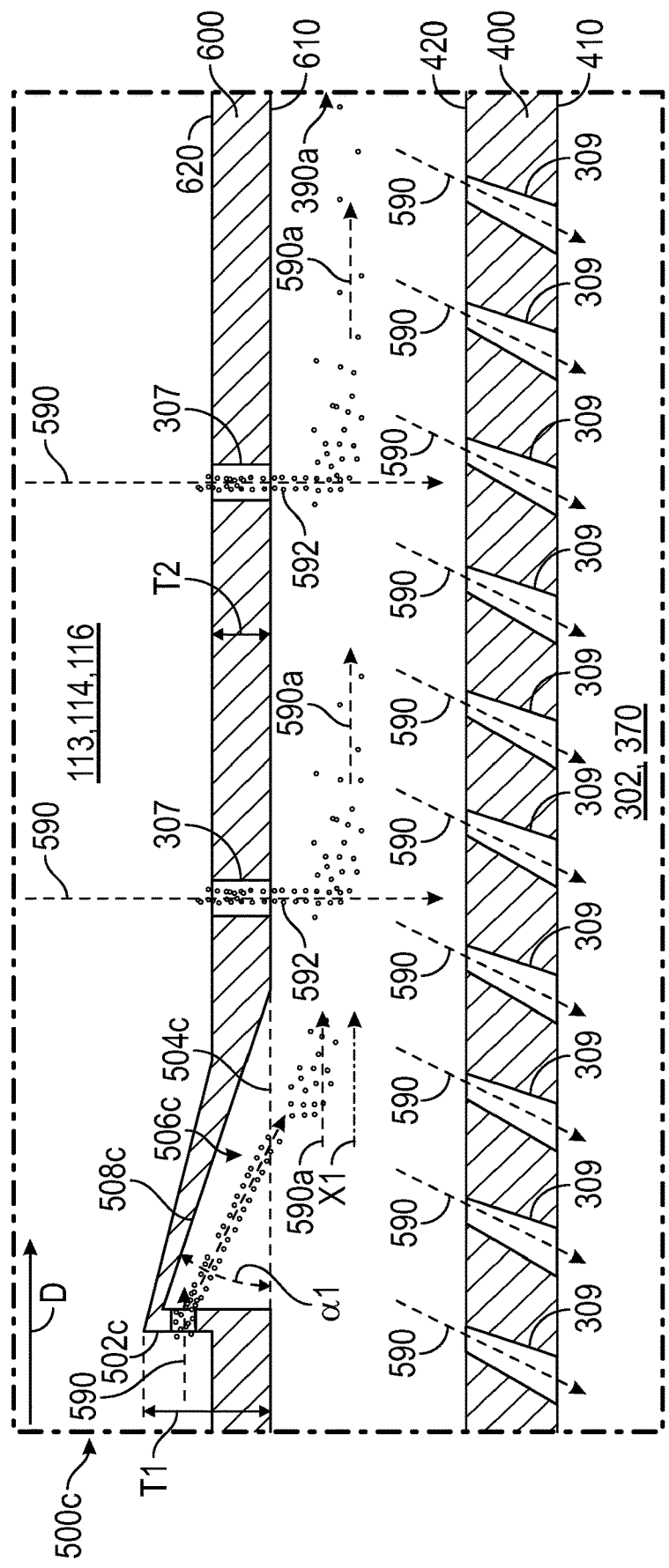
FIG. 4C is an illustration of a configuration of a lateral flow injection feature for a combustor of a gas turbine engine, in accordance with an embodiment of the disclosure.

FIG. 4C illustrates a third configuration of a lateral flow injection feature 500c. A thickness T1 of the combustion liner 600 is greater at the third lateral flow injection feature 500c than a thickness T2 elsewhere in the combustion liner 600, which allows the lateral flow injection feature 500c extend away from the outer surface 620 of the combustion liner 600 into the airflow path D. The third lateral flow injection feature 500c may be formed from deforming the combustion liner 600 to create the passageway 506c and then fluidly connecting the inlet 502c to the passageway 506c.

The passageway 506c of the lateral flow injection feature 500c may include a guide wall 508c oriented at a selected angle α1 configured to direct airflow 592 in about a lateral direction X1 to generate a cross flow 590a. In the example illustrated in FIG. 4C, the guide wall 508c partially encloses the passage way 506c. The orientation of the inlet 502c may be about parallel with the airflow path D or about perpendicular to the outer surface 620 of the combustion liner 600, as shown in FIG. 4C. Also, as illustrated in FIG. 4C, the inlet 502c may be circular in shape but it is understood that the inlet 502c may be shaped differently.

Figure 4D:
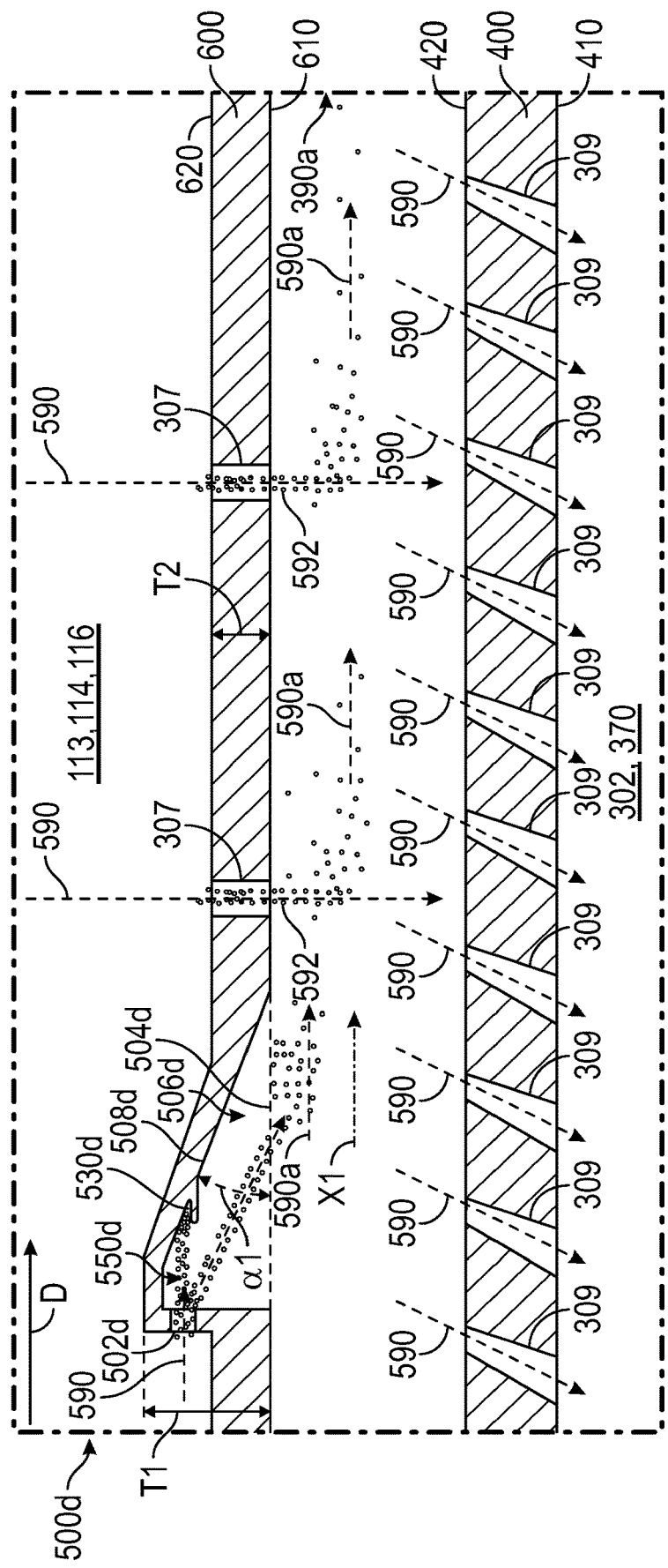
FIG. 4D is an illustration of a configuration of a lateral flow injection feature for a combustor of a gas turbine engine, in accordance with an embodiment of the disclosure.

FIG. 4D illustrates a fourth configuration of a lateral flow injection feature 500d. A thickness T1 of the combustion liner 600 is greater at the fourth lateral flow injection feature 500d than a thickness T2 elsewhere in the combustion liner 600, which allows the lateral flow injection feature 500d extend away from the outer surface 620 of the combustion liner 600 into the airflow path D. The fourth lateral flow injection feature 500d may be formed from deforming the combustion liner 600 to create the passageway 506d and then fluidly connecting the inlet 502d to the passageway 506d.

The passageway 506d of the lateral flow injection feature 500d may include a guide wall 508d oriented at a selected angle α1 configured to direct airflow 592 in about a lateral direction X1 to generate a cross flow 590a. In the example illustrated in FIG. 4D, the guide wall 508d partially encloses the passage way 506d. The orientation of the inlet 502d may be about parallel with the airflow path D or about perpendicular to the outer surface 620 of the combustion liner 600, as shown in FIG. 4D. Also, as illustrated in FIG. 4D, the inlet 502d may be circular in shape but it is understood that the inlet 502d may be shaped differently.

A particulate collection location 530d may be located opposite the inlet 502d and proximate a particulate separation 550d turn in the passageway 506d. The particulate collection location 530d in FIG. 4D is configured as a collection well. The particulate separation turn 550d is configured to turn airflow 590 a selected angle such that the airflow 590 will continue through the passageway 506d but momentum of the particulate 592 will carry the particulate 592 into the collection location 530d. Advantageously, the separation turn 550d may help reduce entry of particulate 592 into the impingement gap 390.

It is understood that the configurations of lateral flow injection feature 500a-d are shown in FIGS. 4A-D for illustrated purposes and are not intended to be limiting thus embodiments shown in each configuration may be mixed and/or combined among the different configurations.

It is understood that a combustor of a gas turbine engine is used for illustrative purposes and the embodiments disclosed herein may be applicable to additional components of other than a combustor of a gas turbine engine, such as, for example, a first component and a second component defining a cooling channel therebetween. The first component may have cooling holes similar to the primary orifices. The cooling holes may direct air through the cooling channel to impinge upon the second component.

Technical effects of embodiments of the present disclosure include incorporating lateral flow injection feature into a combustion liner to introduce lateral airflow across a heat shield panel surrounding a combustion area of a combustion chamber to help reduce collection of particulates on the heat shield panel and also help to reduce entry of the particulate into the combustion area.

The term "about" is intended to include the degree of error associated with measurement of the particular quantity based upon the equipment available at the time of filing the application. For example, "about" can include a non-limiting range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A combustor for use in a gas turbine engine, the combustor enclosing a combustion chamber having a combustion area, wherein the combustor comprises:
   a combustion liner having an inner surface defining the combustion chamber and an outer surface opposite the inner surface, the combustion liner including a primary aperture extending from the outer surface to the inner surface through the combustion liner, the outer surface of the combustion liner being oriented relative to a first airflow path such that airflow in the first airflow path separates from the outer surface of the combustion liner;
   a first fairing secured to the combustor, the first fairing defining a first air passageway between the outer surface of the combustion liner and the first fairing, and a second air passageway between the first fairing and a combustor casing, the first fairing being located between the first air passageway and the second air passageway, the first air passageway extending from an inlet to an exit, the first fairing being configured to redirect the airflow in the first airflow path such that the airflow exits the first air passageway and the first fairing parallel to the outer surface of the combustion liner, the first air passageway being located completely outside the combustion chamber, such that the inlet of the first air passageway and the exit of the first air passageway are located completely outside the combustion chamber, and a heat shield panel interposed between the inner surface of the combustion liner and the combustion area, the heat shield panel having a first surface and a second surface opposite the first surface, the second surface being oriented towards the inner surface of the combustion liner, and the heat shield panel is separated from the combustion liner by an impingement cavity, wherein the first fairing is secured to the combustor through an attachment mechanism, the attachment mechanism securing the combustion liner and a cowl to the combustor, and wherein the combustion liner, the heat shield panel, and the first fairing are annular and concentric, and the first fairing is secured to the combustor proximate a forward end of the combustor, and wherein a forward end and a rearward end of the first fairing each extend from a central portion of the first fairing, the central portion of the first fairing being generally aligned with a point of securement of the first fairing to the attachment mechanism, the forward end and the rearward end of the first fairing each being radially displaced from the central portion of the first fairing.

2. The combustor of claim 1, further comprising:
a second fairing secured to the first fairing, the second fairing being configured to redirect airflow in a second airflow path such that the airflow exits the second fairing oriented parallel with the outer surface of the combustion liner, wherein the first fairing is interposed between the second fairing and the combustor.

3. The combustor of claim 2, wherein:
the first fairing is secured to the combustor through a bolt located in the cowl of the combustor.

4. The combustor of claim 3, further comprising:
a bracket attached to the first fairing, the bracket securing the first fairing to the combustor through the bolt.

5. The combustor of claim 1, further comprising: a bracket attached to the first fairing, the bracket securing the first fairing to the combustor through the attachment mechanism.

6. The combustor of claim 1, further comprising
a lateral flow injection feature formed in the combustion liner, the lateral flow injection feature fluidly connecting airflow in the first air passageway to the impingement cavity, the lateral flow injection feature being configured to direct airflow from the first air passageway through a passageway and into the impingement cavity in a lateral direction parallel to the second surface of the heat shield panel such that a cross flow is generated in the impingement cavity.

7. The combustor of claim 6, wherein the passageway further comprises:
a guide wall oriented at a selected angle configured to direct airflow at least partially in the lateral direction parallel to the second surface of the heat shield panel such that the cross flow is generated in the impingement cavity.

8. The combustor of claim 6, wherein:
the lateral flow injection feature is fluidly connected to the airflow exiting the first fairing through an inlet oriented parallel with the airflow exiting the first fairing.

9. The combustor of claim 1, further comprising:
wherein the heat shield panel further comprises a secondary aperture extending from the second surface of the heat shield panel to the first surface of the heat shield panel and fluidly connecting the impingement cavity to the combustion area.

10. The combustor of claim 1, wherein the rearward end of the first fairing is located proximate or at a forwardmost attachment mechanism of the heat shield panel, the forwardmost attachment mechanism securing the heat shield panel to the combustion liner on the radially inward side of the combustor.

11. The combustor of claim 1, wherein the rearward end of the first fairing is cantilevered with respect to the central portion of the first fairing.

12. The combustor of claim 11, wherein the rearward end of the first fairing is free floating and not secured to any structure.

13. The combustor of claim 1, wherein the rearward end of the first fairing is free floating and not secured to any structure.

* * * * *